United States Patent [19]
Kennefick et al.

[11] Patent Number: 5,020,427
[45] Date of Patent: Jun. 4, 1991

[54] HAND BREADING APPARATUS

[76] Inventors: Thomas M. Kennefick, 50 W. Leslie La., Villa Park, Ill. 60181; Frank Portillo, Jr., 6 Oak Brook Club Dr., Oak Brook, Ill. 60521

[21] Appl. No.: 615,321

[22] Filed: Nov. 19, 1990

[51] Int. Cl.$^5$ .................. A23B 4/10; A23G 3/26; B05C 3/00; B05C 11/00
[52] U.S. Cl. ........................ 99/494; 99/516; 118/16; 118/19; 118/23; 118/26
[58] Field of Search ............ 99/494, 516, 534–536, 99/537, 348; 118/16, 19, 23, 26, 29, 30

[56] References Cited

U.S. PATENT DOCUMENTS

| | | | |
|---|---|---|---|
| 3,129,167 | 4/1964 | Frangos | 118/23 X |
| 3,469,561 | 9/1969 | Gordon | 118/19 |
| 3,520,277 | 7/1970 | Gordon | 118/23 |
| 3,709,193 | 1/1973 | Moore | 99/516 |
| 3,735,726 | 5/1973 | Butler | 99/475 |
| 3,855,965 | 12/1974 | Gordon | 118/16 |
| 3,910,227 | 10/1975 | Reece | 118/29 |
| 4,182,260 | 1/1980 | Reece | 118/26 |
| 4,458,586 | 7/1984 | Reed | 99/494 |
| 4,543,907 | 10/1985 | Fowler | 366/228 |

FOREIGN PATENT DOCUMENTS 478450 1/1938 United Kingdom ............ 118/26

Primary Examiner—Timothy F. Simone

[57] ABSTRACT

An apparatus for hand breading of food products having a support table, a fry basket rack, a removable flour pan and a removable batter pan. A pivotally mounted sifter basket is translatable over the length of the support table in substantial alignment with the basket rack, flour pan and batter pan. A removable doughball collection trough is disposed transversely of the support table between the flour pan and basket rack.

5 Claims, 2 Drawing Sheets

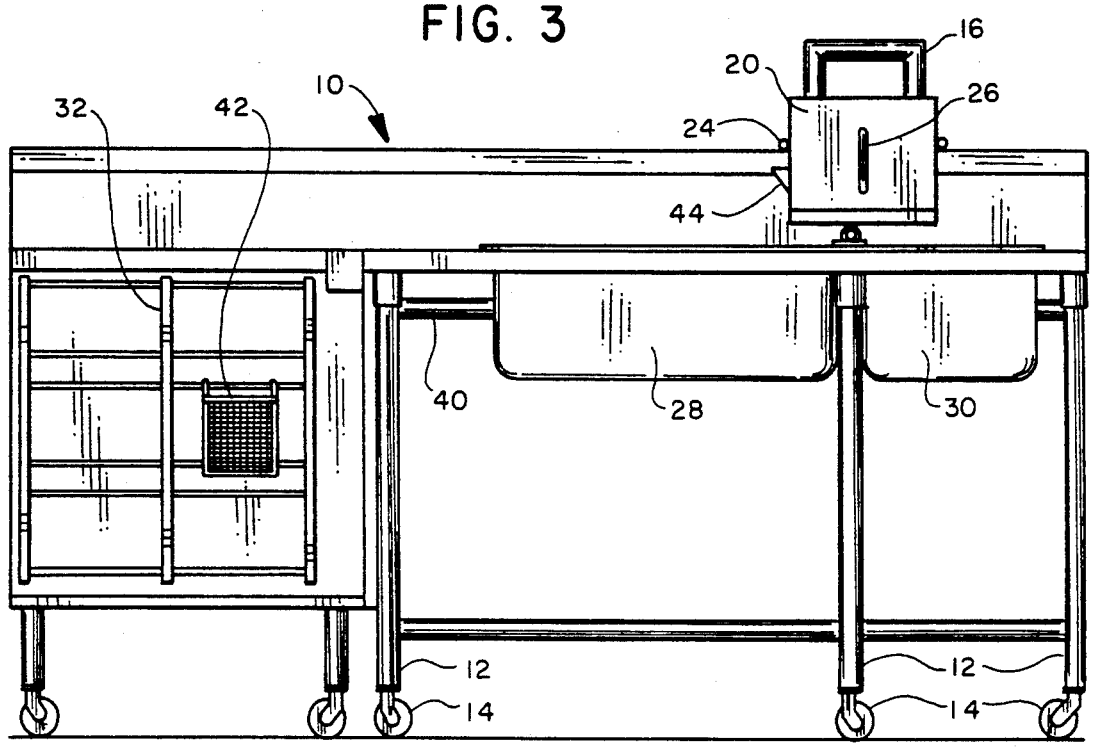
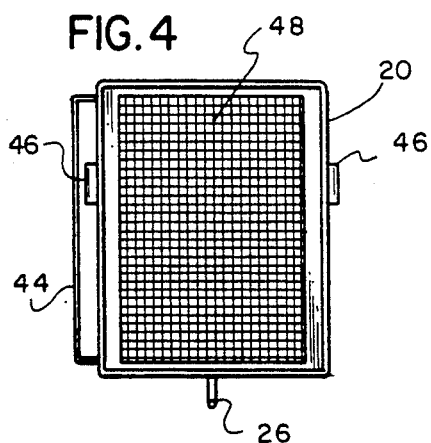
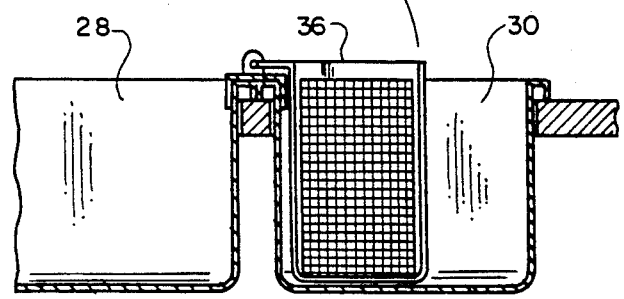

HAND BREADING APPARATUS

BACKGROUND OF THE INVENTION

1. Field of the Invention

The present invention relates generally to apparatus for the preparation of breaded food products and more particularly to a new and improved manual apparatus for breading such products.

2. Description of the Prior Art

In a variety of restaurant operations foods such as chicken parts, shrimp, fish and vegetables to be deep fried are breaded by hand dredging in a spiced flour mixture, immersion in an appropriate batter and dredging a second time in the flour mixture. Aside from being a labor intensive operation, it has been difficult to produce a uniform breading thickness and results in an inordinately high use of flour in part due to an accumulation of doughballs in the flour mixture. Further flour dust can produce damage to other kitchen equipment such as compressors and fans.

Some prior art devices have involved certain motor driven elements in attempts to improve one or more aspects of the breading operation. Among these are U.S. Pat. No. 3,910,227 which issued on Oct. 7, 1975 and discloses a power driven sifter. U.S. Pat. Nos. 3,469,561 and 3,855,965 which issued on Sept. 30, 1969 and Dec. 24, 1974 respectively describe tumbling type breading devices. None of these prior art breading apparatus have been found to resolve the prior problems in a fashion which is economical for an individual restaurant operation.

OBJECTIVES AND SUMMARY OF THE INVENTION

From the preceding discussion it will be understood that among the various objectives of the present invention are included the following:

the provision of a new and improved hand breading apparatus;

the provision of an apparatus of the above-described character with an improved sifting feature for improved distribution of the flour mixture on the food pieces; and the provision of an apparatus of the above-described character which removes doughballs from the breaded food pieces.

These and other objectives of the present invention are efficiently achieved by providing an elongate support table with removable pans for the flour mixture and the batter. A pivotally mounted sifter basket is translatable over the length of the table in alignment with the batter and flour pans. A rack for supporting fry baskets is disposed at the end of the table adjacent the flour pan with a removable doughball trough interposed therebetween. The food product is dredged in the flour mixture and placed in the sifter basket where excess flour is removed by manual oscillation of the basket. The floured product is then discharged into the batter pan and then returned to the flour pan for final breading The breaded product is returned to the sifter basket to remove excess reusable flour. The product is then discharged into a fry basket while any doughballs are caught in the trough.

The foregoing as well as other objects, features and advantages of the present invention will become more apparent from the following detailed description taken in conjunction with the various views of the appended drawings.

BRIEF DESCRIPTION OF THE DRAWINGS

FIG. 3 is a transverse cross-section view of the apparatus of FIG. 1;

FIG. 4 is a top elevation view of the sifter basket 26 of FIGS. 1 and 2 wherein elements common to those illustrated in said FIGS. 1 and 2 are identified by like reference characters; and FIG. 5 is a cross-section view of the batter basket 36 of FIG. 1.

DESCRIPTION OF THE PREFERRED EMBODIMENT

Figure 1:
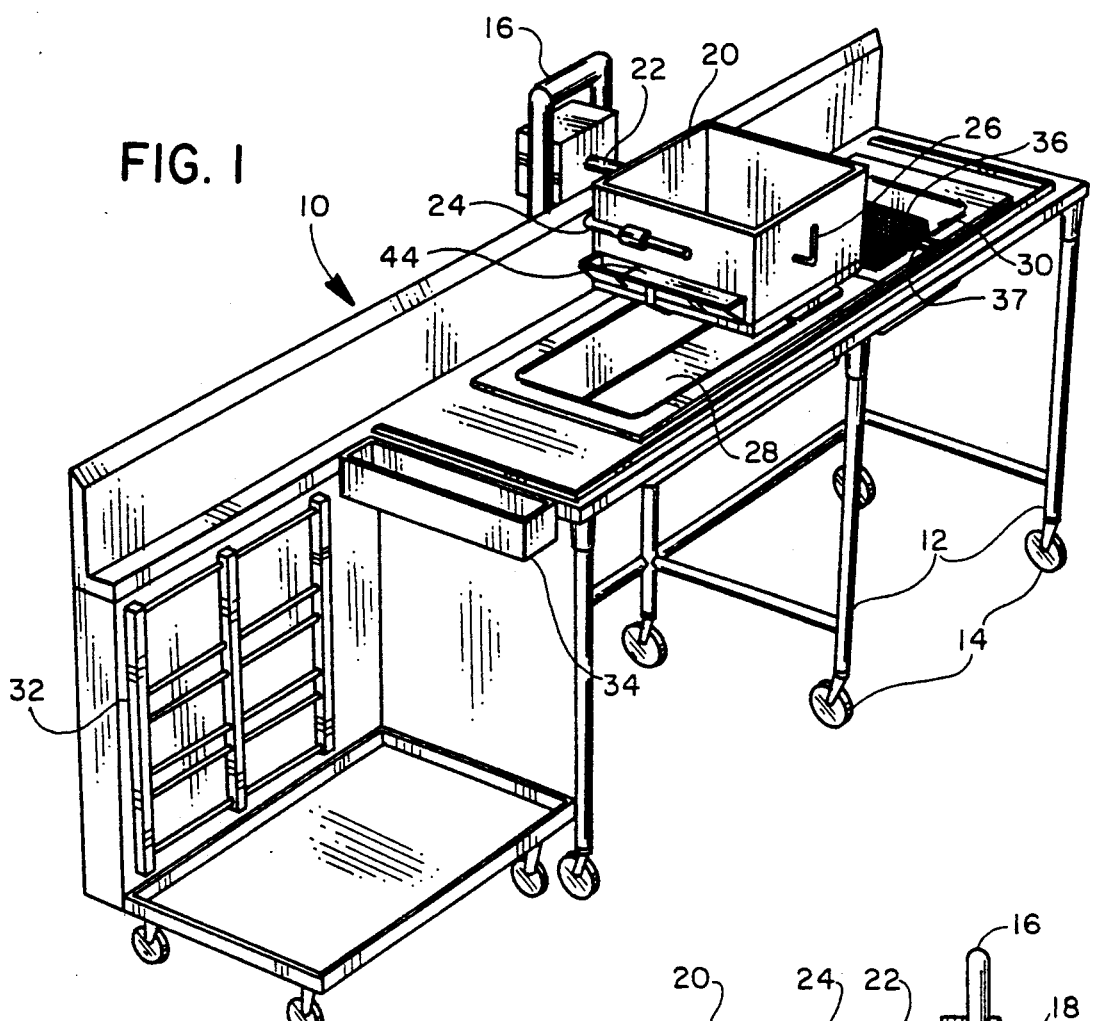
FIG. 1 is an elevation view of a breading apparatus in accordance with the principles of the present invention.

With reference now to FIG. 1 there is illustrated in an elevation view a breading apparatus including an elongate support table 10 having a plurality of legs 12 each provided with a caster 14. The rear of the table 10 is provided with a vertical support member 16 for a longitudinally translatable carriage assembly 18. A sifter basket 20 is pivotally mounted to the carriage assembly 18 by a shaft 22 and retained in place by a spring loaded yoke 24. The sifter basket 20 is provided with a handle 26 by which the basket may be manually rocked back and forth in rotation about the shaft 22.

The table 10 is provided with removable pans 28 for a flour mixture and 30 for a batter mixture. At the end of the table 10 nearest the flour pan 28 a fry basket rack 32 for holding a plurality of deep fryer baskets (not shown) is provided. A removable doughball trough 34 is disposed at the end of the table 10 adjacent the fry basket rack 32.

The batter pan 30 has a batter basket 36 attached by hinges 38 to the edge adjacent the flour pan 28 whereby the basket 36 may be raised and rotated such as to transfer the battered food product into the flour pan 28 for final breading while allowing excess batter to drain back into the batter pan 30.

Figure 2:
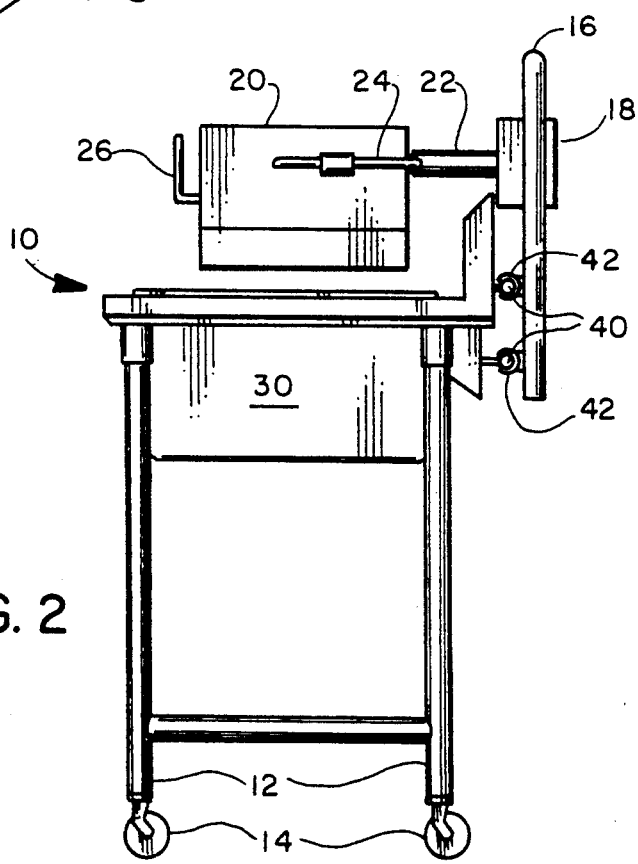
FIG. 2 is a longitudinal cross-section view of the apparatus of FIG. 1.

FIG. 2 is a transverse cross-section or end view of the apparatus of FIG. 1 wherein elements common to those illustrated in FIG. 1 are identified by like reference characters. The vertical support member 16 at the rear of the table 10 has two longitudinal rails 40 on which the sifter basket carriage assembly 18 is supported for linear translation in bearings 42.

The operation of the breading apparatus of the present invention may best be understood with reference to FIG. 3. A fry basket 42 having a quantity of food product such as chicken parts is removed from the fry basket rack 32 and the contents dumped into the flour mixture in pan 28. The product is manually dredged in the flour mixture and removed to the sifter basket 20. While above the pan 28 the sifter basket 20 is rocked back and forth to tumble the product, distributing the flour and removing the excess which falls back into the pan 28 to be reused. The sifter basket 20 is then moved into position above and the contents dumped into the batter basket 36 in pan 30 The sifter basket 20 is moved out of the way and the batter basket 36 is lifted by handle 37 and rotated such as to transfer the battered product back to the flour pan 28. The product is again hand dredged in the flour mixture and returned to the sifter basket 20. The product is again tumbled to remove excess flour. The sifter basket 20 is then moved to the end of the table 10 and the contents dumped back into the fry basket 42.

In the breading process a certain amount of the flour mixture will form into doughballs and be retained in the sifter basket 20. When the product is dumped back into the fry basket 42 any doughballs are also dumped through a chute 44 at the lower portion of the sifter basket 20 into the doughball trough 34 for later disposal.

FIG. 4 is an illustration of the sifter basket 20 of FIGS. 1, 2 and 3. The sifter basket 20 has a screen mesh lower surface 48 of a screen size which allows reusable flour mixture to be returned to the flour pan but retains doughballs which are formed when the flour mixture combines with excess batter. The chute 44 allows the doughballs to exit the sifter basket 20 as the breaded product is dumped into the fry basket. An accumulation of doughballs in the reusable flour mixture is thus effectively prevented.

FIG. 5 illustrates in more detail the batter basket 36 of FIG. 1. A mounting bracket 50 is adapted to fit between the flour pan 28 and the batter pan 30 and has two (only one shown) upstanding tabs 52 each with a hole 54 therethrough. The batter basket 36 is provided with two (only one shown) pins 56 extending outwardly and then longitudinally which are adapted to engage the holes 54 in tabs 52 to provide a hinged mounting for the batter basket 36. Once the product has been coated with batter, the batter basket 36 is rotated up and out of the batter, allowing most of the excess batter to drain back into the batter pan 30, and the product returned to the flour pan 28.

From the foregoing it will be understood that the applicant has provided a new and improved hand breading apparatus wherein the objectives set forth hereinabove are efficiently achieved. Since certain changes in the above-described construction will occur to those skilled in the art without departure from the scope of the invention it is intended that all matter set forth in the above description or shown in the appended drawings shall be interpreted as illustrative and not in a limiting sense.

Having described what is new and novel and desired to secure by Letters Patent, what is claimed is:

1. Apparatus for hand breading of food products comprising
    an elongate support table;
    an elongate vertical support member disposed on one long side of said table;
    a carriage assembly supported by and linearly translatable with respect to said support member;
    a sifter basket coupled to and translatable with said carriage assembly above the top surface of said support table and manually rotatable with respect to said carriage assembly about an axis transverse to the longitudinal axis of said support member;
    a flour pan disposed in the top surface of said table and adapted to receive and retain a quantity of flour mixture;
    a batter pan disposed in the top surface of said table linearly adjacent said flour pan and adapted to receive and retain a quantity of batter mixture; and
    a batter basket disposed in said batter pan for receiving said food products and removing said food products after immersion in said batter mixture;
    whereby food products placed in said flour pan may be dredged in flour mixture and removed to said sifter basket where excess flour mixture is removed by oscillatory rotation of said sifter basket, floured products are translated to said batter pan and discharged into said batter basket then removed and returned to said flour pan, for re-dredging in said flour mixture, the breaded products are then removed to the sifter basket where excess flour mixture is again removed.

2. An apparatus as set forth in claim 1 wherein
    said supporting table has first and second apertures disposed through the top surface thereof; and
    said flour pan and said batter pan are removably suspended in respective said apertures.

3. An apparatus as set forth in claim 1 wherein
    said batter basket is formed of a mesh material and hingedly affixed to the edge of said batter pan adjacent said flour pan;
    whereby battered food products are removed to said flour pan while allowing excess batter to return to said batter pan.

4. An apparatus as set forth in claim 1 further including
    means for supporting a cooking basket for breaded food products adjacent the end of said support table nearest said flour pan;
    whereby breaded food products may be discharged from said sifter basket into said cooking basket.

5. An apparatus as set forth in claim 4 further including
    a discharge slot disposed in the side of said sifting basket facing said cooking basket supporting means and proximate the bottom surface of said sifting basket; and
    a doughball trough disposed between the end of said supporting table and said cooking basket support means;
    whereby as breaded food products are discharged into said cooking basket any accumulated doughballs are discharged through said slot into said doughball trough.

* * * * *